Feb. 22, 1955 W. R. KNOWLTON 2,702,493
ANAMORPHIC CYLINDRICAL LENS CONSTRUCTION
Filed July 23, 1953
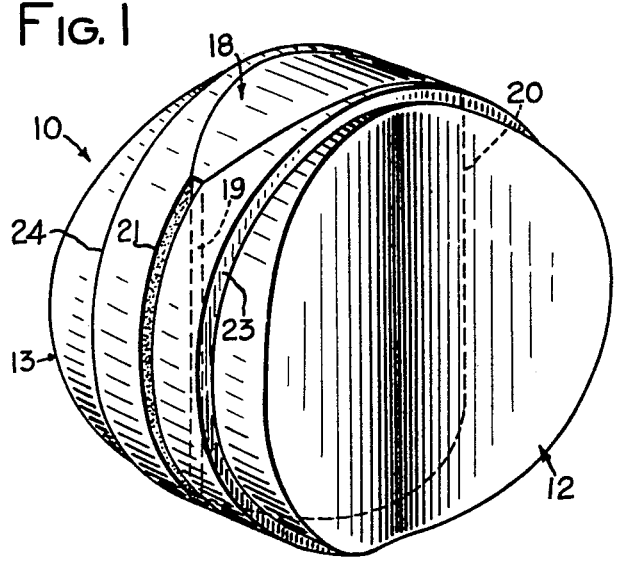
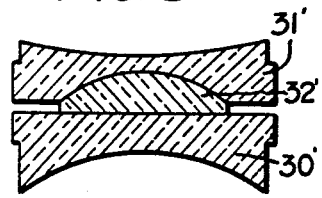
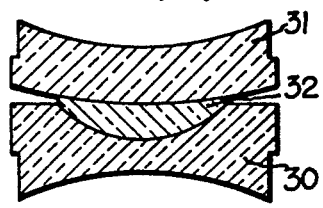
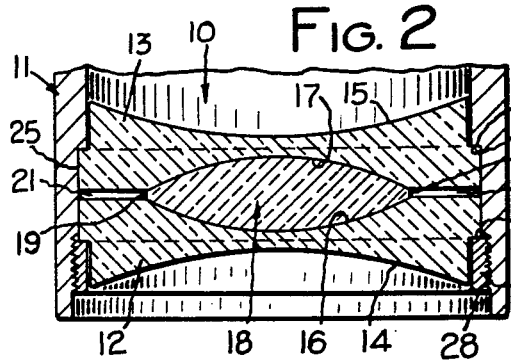
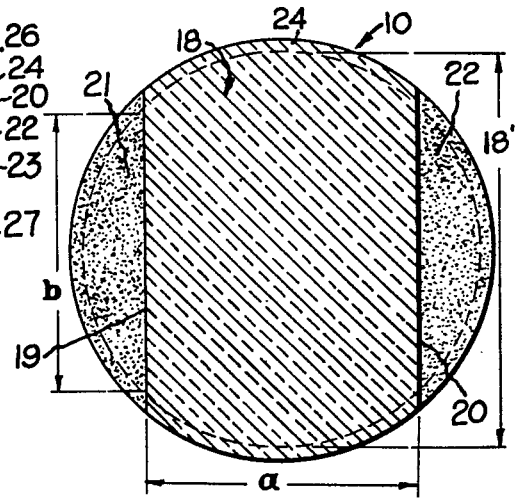
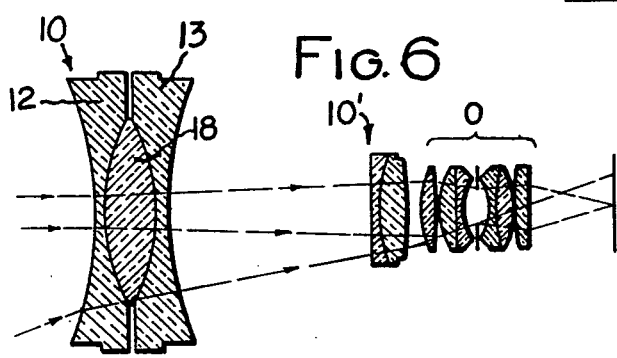
INVENTOR.
WILLIAM R. KNOWLTON
BY
ATTORNEY

United States Patent Office 2,702,493
Patented Feb. 22, 1955

2,702,493

ANAMORPHIC CYLINDRICAL LENS CONSTRUCTION

William R. Knowlton, Greece, N. Y., assignor to Bausch & Lomb Optical Company, Rochester, N. Y., a corporation of New York Application July 23, 1953, Serial No. 369,907

4 Claims. (Cl. 88—57)

This invention relates to lens systems and more particularly it relates to lens systems which include converging cylindrical lens elements of such construction that they act as aperture-limiting stops in the lens systems. In such a type of lens system, the converging cylindrical lens element is customarily made in a substantially square form and is held in a square type of mounting. When such a lens system is used for photographic or projection purposes, the converging, cylindrical element with its square profile often produces vignetting at the corners of the projected image. Moreover, it is difficult to properly align and hold such cylindrical elements in square mounts. Such difficulties and disadvantages are encountered, for example, in an anamorphic lens system of the type disclosed in United States Patent No. 1,962,892 issued on June 12, 1934, to Henri Chretien.

One of the objects of the present invention is to provide improved lens means which will overcome the above-mentioned disadvantages and difficulties. Another object is to provide, in a lens system of the type described, a converging cylindrical lens element which will afford maximum transmission of light through the system. Still another object is to provide improved means for mounting a converging cylindrical lens element in a lens system. A further object is to provide for an anamorphic lens system a compound cylindrical lens, including a converging cylindrical element, which will transmit a larger proportion of the off-axis image rays than is possible with prior art devices so that vignetting in the corners of the image produced by the system will be reduced.

These and other objects and advantages reside in certain novel features of construction, arrangement and combination of parts as will hereinafter be more fully described and pointed out in the appended claims.

Referring to the drawings:

Fig. 1 is a perspective view of a cylindrical lens embodying a preferred form of my invention.

Fig. 2 is a central, horizontal, sectional view of said lens, taken on a reduced scale, and assembled in a fragmentarily shown mounting.

Fig. 3 is a vertical, central, sectional view taken through the lens of Fig. 1.

Fig. 4 is a horizontal, sectional view of a second form of my invention.

Fig. 5 is a horizontal, sectional view of another form of my invention.

Fig. 6 is a diagrammatic view, in a horizontal plane, of a lens system which includes a lens embodying my invention.

A preferred embodiment of my invention is disclosed in Figs. 1–3 in which 10 indicates a multi-element or compound cylindrical lens which is mounted in a circular mounting tube 11. The compound lens 10 consists of the front and rear dispersive lens elements 12 and 13 which have the front and rear concave cylindrical refractive surfaces 14 and 15, respectively. On their opposite sides, these lens elements are provided, respectively, with concave cylindrical refractive surfaces 16 and 17 which are cemented to the adjacent convex surfaces of the intermediate converging or collective cylindrical lens element 18. The axes of the cylindrical surfaces of all elements lie in a common vertical plane along the optical axis of the lens 10.

In this particular type of cylindrical lens, the converging or collective element 18 is constructed with such radii of curvature and axial spacing of its refractive faces that the horizontal dimension of the element acts as an aperture-limiting stop for light rays passing through the lens. In such a construction, the convex refractive surfaces of the lens element 18 converge at the sides thereof so that narrow vertical edges 19 and 20 are formed thereon. This type of converging cylindrical lens element is customarily constructed so that its edge profile is substantially square or rectangular and so can be held in a mounting of a similar shape.

In accordance with the present invention, it is possible to increase the light transmission through a converging element which acts as an aperture-limiting stop, such, for example, as converging element 18 in the anamorphic lens system shown in Fig. 6. At the same time, it is also possible to provide improved means for mounting such a converging lens element so that it may be held in the usual circular tube mounting. This is accomplished by providing the two dispersive elements 12 and 13 with circular profiles and extending the converging element 18 so that its vertical dimension is substantially the same as the diameter of the circular profiles of the dispersive elements 12 and 13. The upper and lower ends of element 18 are edged arcuately so as to conform to the circular profile or circumference of the elements 12 and 13.

By thus increasing the size of the converging element 18, there is produced a gain of more than 20% in light-transmitting area over the maximum size of the usual square form of converging element such as shown by dimensions $a$ and $b$ in Fig. 3. This extra area of the converging element 18 permits the passage of more off-axis light rays and hence the total amount of light transmitted through the lens 10 is increased. The effective vertical dimension or diameter of the converging element 18 along its axis is substantially 1.5 times greater than its horizontal dimension. Along the vertical edges 19 and 20 of the converging element 18, the adjacent surfaces of the dispersive elements 12 and 13 are cut away so as to form narrow slots 21 and 22 which may be filled with any suitable opaque material, such as black paint, in order to prevent the passage of stray light rays therethrough.

In order to hold the lens 10 in its mounting tube 11, the radial mounting shoulders 23 and 24 are formed, respectively, on the peripheries of the dispersive elements 12 and 13 at longitudinal positions where the right sections thereof are full circles. The mounting tube 11 has a smooth bore 25 which fits the outer diameters of lens elements 12 and 13 so that mounting shoulder 24 engages a radial shoulder 26 formed in the mounting tube. A clamping ring 27 is threaded at 28 to the mounting tube 11 and bears against the mounting shoulder 23 so as to detachably retain the lens 10 in the mounting 11.

In one successful embodiment which was produced in accordance with this invention, the lens 10 comprised a double convex converging element 18 having both of its surfaces formed with a radius of curvature of 53.01 mm. and an axial thickness of 14.6 mm. The inner surfaces 16 and 17 of the dispersive elements 12 and 13 had a radius of curvature of 53.01 mm. while the outer concave surfaces 14 and 15 of these elements had a radius of curvature of 94.98 mm. and both elements had an axial thickness of 3.1 mm. Both dispersive elements had the same maximum circular profile with a diameter of 77.8 mm. where they fit into the bore 25 of mounting tube 11. The smaller circular profiles of the elements 12 and 13 had a diameter of 74.0 mm. The collective element 18 had a horizontal dimension of 51.0 mm. and a vertical dimension of 77.8 mm. The upper and lower ends of the element 18 were arcuately formed so that they conformed to the curvature of the largest circular profile on the dispersive elements.

Fig. 4 shows another form of compound cylindrical lens having the dispersive elements 30 and 31 which have their adjacent faces cemented to a collective or converging element 32. Fig. 5 shows still another form of a compound cylindrical lens in which the dispersive elements 30' and 31' have their adjacent faces cemented to a converging or collective cylindrical element 32'. All of the dispersive elements are edged so as to have circular peripheries or profiles and the upper and lower edges of the converging elements are edged arcuately so as to mate with the circular profiles of the dispersive elements in the same manner as shown in Figs. 1–3.

Fig. 6 shows a diagrammatic view, in a horizontal plane, of an anamorphic lens system which is used in taking pictures. This system comprises the camera lens objective 0 and the cylindrical lens system which includes the cylindrical lens 10 embodying my invention and the additional cylindrical lens 10′. In this lens system, it will be noted that the horizontal dimension of the converging cylindrical element 18 of lens 10 acts as an aperture-limiting stop for light rays passing through the lens system. However, by increasing the vertical dimension of the converging element 18, it is possible to increase the total transmission of the light rays through the system since the additional area of element 18 permits the transmission of off-axis light rays. Besides providing for an increase of light transmission, my improvement makes it possible to mount such a converging lens element as 18 in the usual type of circular lens mounting. Hence, by my invention the optical performance is improved and the mechanical mounting of the lens elements is greatly facilitated. Various modifications can, obviously, be made without departing from the spirit of my invention as pointed out in the appended claims.

I claim:

1. In a lens system having a plurality of lenses, a compound cylindrical lens comprising two spaced diverging cylindrical lens elements, a converging cylindrical lens element cemented to the respectively adjacent faces of the diverging elements, all of the axes of the surfaces of said elements lying in a vertical plane, the refractive surfaces and thickness of said converging element being such that the horizontal dimension of the element acts as an aperture-limiting stop for light rays passing through the system, the vertical height of said converging element being substantially 1.5 times its horizontal dimension, the diverging elements each having a circular profile and a diameter which is substantially the same as the vertical dimension of the converging element, the adjacent surfaces of the diverging elements being opaque along the sides of the converging element whereby the transmission of off-axis light rays through the system is increased and the lens may be secured in a circular mount.

2. In a lens system having a plurality of lenses, a compound cylindrical lens comprising a converging cylindrical lens element, a pair of diverging cylindrical lens elements positioned on opposite sides of the converging element, the adjacent surfaces of the elements being cemented together, the axes of all cylindrical surfaces lying in a single vertical plane, the converging element being of such construction that its horizontal dimension acts as an aperture-limiting stop for light rays passing through the lens, the vertical height of the converging element being greater than its horizontal dimension whereby transmission of off-axis light rays through the lens is increased, each diverging element having a circular profile with a diameter which is substantially the same as the height of the converging element, the adjacent surfaces of the diverging elements being cut away along the sides of the converging element, the upper and lower ends of the converging element being arcuately formed to blend with the circular profiles of the diverging elements whereby the lens may be mounted in a circular mount.

3. A cylindrical lens comprising a pair of spaced double concave cylindrical lens elements, a double convex cylindrical lens element positioned between and cemented to the adjacent faces of the concave elements, the axes of all the cylindrical surfaces lying in a vertical plane, the horizontal dimension of the convex cylindrical element acting as an aperture-limting stop for light rays passing through the lens, the concave lens elements each having a continuous circular shoulder on its periphery, the diameters of the two concave elements being substantially the same and being larger than the horizontal dimension of the convex element, the vertical dimension of the convex element being substantially the same as the diameters of the concave elements, the inner adjacent faces of the concave elements being cut away along the respective vertical sides of the convex element, a circular tubular mount having an internal shoulder, the lens being positioned within the mount with the shoulder of one element abutting the internal shoulder on the mount, and a clamping ring threaded into the mount and against the shoulder on the other element whereby the lens is held in the circular mount and the transmission of off-axis light rays through the lens is increased.

4. In a lens system having a plurality of lenses, a compound cylindrical lens comprising a converging cylindrical lens element and a pair of diverging cylindrical lens elements positioned respectively on the opposite sides of the converging element, and the elements having adjacent refracting surfaces which are cemented together, the axes of all cylindrical surfaces lying in a common plane, the converging element being of such construction that its horizontal dimension acts as an aperture-limiting stop for light rays passing through the lens, the vertical height of the converging element being greater than its horizontal dimension whereby transmission of off-axis light rays through the lens is increased, each diverging element having a circular profile with a diameter which is substantially the same as the height of the converging element, the diverging elements having adjacent, spaced, opaque surfaces extending along the respective sides of the converging element, the upper and lower ends of the converging element being arcuately formed to blend with the circular profiles of the diverging elements whereby the lens may be mounted in a circular mount.

References Cited in the file of this patent

UNITED STATES PATENTS

| Number | Name | Date |
| --- | --- | --- |
| 1,292,901 | Smith | Jan. 28, 1919 |
| 1,321,906 | Gehrmann | Nov. 18, 1919 |
| 1,960,044 | Barmak | May 22, 1934 |
| 1,962,892 | Chretien | June 12, 1934 |
| 2,013,845 | Wolfe | Sept. 10, 1935 |
| 2,036,622 | Emmerich | Apr. 7, 1936 |
| 2,428,399 | Timoney | Oct. 7, 1947 |
| 2,491,093 | Dibble et al. | Dec. 13, 1949 |
| 2,637,242 | Osterberg et al. | May 5, 1953 |